(12) United States Patent
Quinn et al.

(10) Patent No.: US 8,632,097 B1
(45) Date of Patent: Jan. 21, 2014

(54) SYSTEMS AND METHODS FOR HAND WHEEL TRANSLATIONAL VIBRATION ATTENUATION

(71) Applicant: GM Global Technology Operations LLC, Detroit, MI (US)

(72) Inventors: Shawn G. Quinn, Grand Blanc, MI (US); David P. Hamilton, Clarkston, MI (US); Mark A. Stebbins, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/650,541

(22) Filed: Oct. 12, 2012

(51) Int. Cl.
  *B62D 1/04* (2006.01)
  *B62D 1/11* (2006.01)
(52) U.S. Cl.
  USPC ........... 280/771; 74/552; 188/267.1; 188/378
(58) Field of Classification Search
  USPC .................... 280/771, 779; 188/267.1, 267.2, 188/378–380; 74/492, 552
  IPC ................................................ B62D 1/06, 1/04
  See application file for complete search history.

(56) References Cited

U.S. PATENT DOCUMENTS

| | | | |
|---|---|---|---|
| 6,736,423 B2 * | 5/2004 | Simonian et al. | 280/731 |
| 6,976,403 B2 * | 12/2005 | Oblizajek et al. | 74/552 |
| 7,226,082 B2 * | 6/2007 | Muramatsu et al. | 280/775 |
| 7,316,419 B2 * | 1/2008 | Fischer | 280/779 |
| 7,380,804 B2 * | 6/2008 | Lee | 280/90 |
| 7,562,904 B2 * | 7/2009 | Gustavsson | 280/779 |
| 2002/0124683 A1 * | 9/2002 | Kreuzer et al. | 74/552 |
| 2002/0125084 A1 * | 9/2002 | Kreuzer et al. | 188/267.1 |
| 2004/0084887 A1 * | 5/2004 | Loh et al. | 280/779 |
| 2005/0167966 A1 * | 8/2005 | Fischer | 280/779 |
| 2007/0137415 A1 * | 6/2007 | Thomas | 74/552 |
| 2009/0183959 A1 * | 7/2009 | Klit et al. | 188/267.1 |
| 2011/0017556 A1 * | 1/2011 | Maranville et al. | 188/267.2 |

FOREIGN PATENT DOCUMENTS

JP 2008-39038 A * 2/2008

OTHER PUBLICATIONS

Quinn, Shawn G., et al., Systems and Methods for Hand Wheel Torsional Vibration Attenuation, U.S. Appl. No. 13/650,536, filed Oct. 12, 2012.

* cited by examiner

*Primary Examiner* — Ruth Ilan
(74) *Attorney, Agent, or Firm* — Ingrassia Fisher & Lorenz, P.C.

(57) ABSTRACT

Methods and apparatus are provided for attenuating translational vibration in a steering system. The apparatus can include a housing having a fluid chamber, a recess and a mounting bracket that couples the housing to a hand wheel of the steering system. The fluid chamber can be in communication with the recess. The apparatus can include a mass disposed in the recess of the housing, which can have a fixed stiffness. The apparatus can include a damping fluid disposed in the housing so as to flow between the fluid chamber and the recess. The mass can be movable in the damping fluid, and the damping fluid can have a variable stiffness. The apparatus can further include a control module that determines a translational vibration experienced at the hand wheel and outputs a signal to vary the stiffness of the damping fluid in response to the translational vibration in substantially real-time.

20 Claims, 4 Drawing Sheets

SYSTEMS AND METHODS FOR HAND WHEEL TRANSLATIONAL VIBRATION ATTENUATION

TECHNICAL FIELD

The present disclosure generally relates to vibration attenuation and more particularly relates to systems and methods for steering or hand wheel translational vibration attenuation.

BACKGROUND

Generally, an engine of a motor vehicle can be operated over various speeds. For example, the engine can operate at a speed with the transmission in an idle position, and may operate at a different speed with the transmission in a park position. Each speed of the engine can generally correlate with a vibrational frequency that may be experienced by the operator through a steering or hand wheel of the steering system. In addition, vibrations induced by the engine or powertrain (including transmission) can be considered "forced excitation," which can be experienced by the operator through the hand wheel of the steering system. Road induced vibration can also be experienced by the operator through the hand wheel of the steering system, and these road induced vibrations can be considered "resonant vibration" if driving over irregularly spaced road displacements, for example. Road induced vibration can also be "forced excitation" if the road surface has regularly spaced deformations. Currently, the hand wheel of the steering system may be mechanically tuned to attenuate only a single frequency.

Accordingly, it is desirable to attenuate vibrational frequencies experienced by the operator at the hand wheel over a range of operating conditions. Furthermore, other desirable features and characteristics of the present invention will become apparent from the subsequent detailed description and the appended claims, taken in conjunction with the accompanying drawings and the foregoing technical field and background.

SUMMARY

An apparatus is provided for attenuating translational vibration in a steering system. In one embodiment, the apparatus can include a housing having a fluid chamber, a recess and a mounting bracket that couples the housing to a hand wheel of the steering system. The fluid chamber can be in communication with the recess. The apparatus can also include a mass disposed in the recess of the housing. The mass can have a fixed stiffness. The apparatus can include a damping fluid disposed in the housing so as to flow between the fluid chamber and the recess. The mass can be movable in the damping fluid, and the damping fluid can have a variable stiffness. The apparatus can further include a control module that determines a translational vibration experienced at the hand wheel and outputs a signal to vary the stiffness of the damping fluid in response to the translational vibration in substantially real-time.

A method is provided for attenuating translational vibration in a steering system. In one embodiment, the method can include receiving an input, and based on the input, determining an amount of translational vibration experienced near a hand wheel of the steering system. The method can also include outputting a signal to adjust a viscosity of a damping fluid to change a stiffness of a damping system coupled to a portion of the hand wheel.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
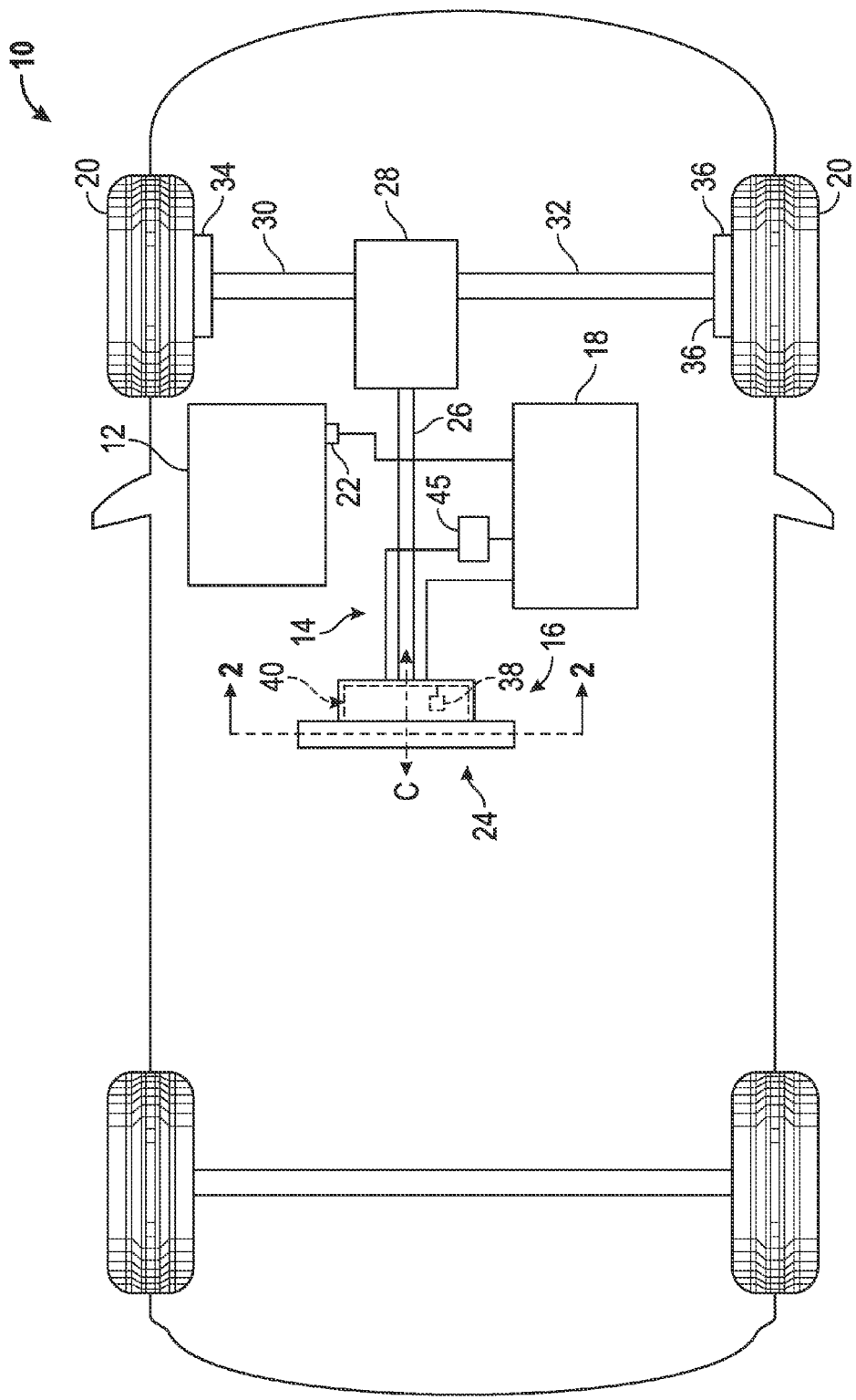
FIG. 1 is a functional block diagram illustrating a vehicle that includes a hand wheel having a translational vibration attenuation system in accordance with an embodiment.

With reference to FIG. 1, a vehicle 10 is shown. The vehicle 10 can include an engine 12, a steering system 14, a vibration attenuation system 16 and a control module 18. As will be discussed in greater detail herein, the control module 18 can receive inputs from the engine 12 and steering system 14 to control the operation of the vibration attenuation system 16. The vibration attenuation system 16 can dampen the vibration amplitude felt by an operator of the vehicle 10 in the steering system 14 at various frequencies and engine speeds. In this regard, vibration at the steering system 14 can be caused by "forced excitation" or "resonant vibration," for example. Vibration induced by the engine 12 or powertrain (including transmission) can be considered "forced excitation," and road induced vibration can be considered "resonant vibration" if driving over irregularly spaced road displacements, for example. Road induced vibration can also be "forced excitation" if the road surface has regularly spaced deformations. As will be discussed herein, the vibration attenuation system 16 can dampen the vibration amplitude felt by an operator of the vehicle 10 in response to forced excitation and/or resonant vibration.

Generally, the engine 12 can comprise any suitable propulsion device, including, but not limited to, an internal combustion engine, electric engine or hybrid thereof. The engine 12 can supply power to a suitable driveline coupled to one or more roadway wheels 20 of the vehicle 10 to enable the vehicle 10 to move. The engine 12 can include a speed sensor 22, which can determine a speed of the engine 12. For example, the speed sensor 22 can measure a rotational speed of the engine and can generate an engine speed signal based thereon. In one example, the speed sensor 22 can measure engine speed in revolutions per minute (rpm) of a crankshaft of the engine 12. The engine speed can correlate to a predetermined amount of vibration of the steering system 14, as will be discussed in greater detail herein.

Generally, the steering system 14 can include a hand wheel 24 coupled to a steering shaft 26. It should be noted that the use of a hand wheel is merely exemplary, as the steering system 14 can include any suitable user input device for steering the vehicle 10, including, but not limited to, a joystick, the hand wheel 24, etc. In one exemplary embodiment, the steering system 14 can comprise an electric power steering (EPS) system, which can include a steering assist unit 28. The steering assist unit 28 can be coupled to the steering shaft 26 of the steering system 14 and to tie rods 30, 32 of the vehicle 10. The steering assist unit 28 can include, for example, a rack and pinion steering mechanism (not shown) that can be coupled through the steering shaft 26 to a steering actuator motor and gearing. During operation, as the hand wheel 24 is turned by a vehicle operator, a motor of the steering assist unit 28 provides the assistance to move the tie rods 30, 32, which in turn moves steering knuckles 34, 36, respectively. The steering knuckles 34, 36 can be coupled to the respective roadway wheels 20 of the vehicle 10. Although an EPS system is illustrated in FIG. 1 and described herein, it is appreciated that the steering system 14 can include various controlled steering systems such as steering systems with hydraulic configurations, steer by wire configurations, non-assisted steering systems, etc.

With continued reference to FIG. 1, the steering system 14 can also include a steering sensor 38. In one example, the steering sensor 38 can be coupled to the vibration attenuation system 16, however, the steering sensor 38 can be coupled to the hand wheel 24, the steering shaft 26, or other suitable location of the steering system 14. In one example, the steering sensor 38 can include an accelerometer, which can measure the acceleration of the steering system 14 and can generate accelerometer signals based thereon. In one example, the steering sensor 38 can be coupled to the hand wheel 24 to observe the movement of the hand wheel 24 in response to vibration, such as the vibration amplitude and frequency. The acceleration of the hand wheel 24 can indicate the amount of vibration experienced by the hand wheel 24, and thus, the operator of the vehicle 10. In this regard, as the hand wheel 24 vibrates, the hand wheel 24 can move. In one example, the hand wheel 24 can move or accelerate in a generally translational or linear direction. For example, the hand wheel 24 can move or accelerate in a generally linear direction along an axis substantially perpendicular to a center line C of the hand wheel 24. This movement of the hand wheel 24 can be measured as an acceleration by the steering sensor 38.

Figure 2:
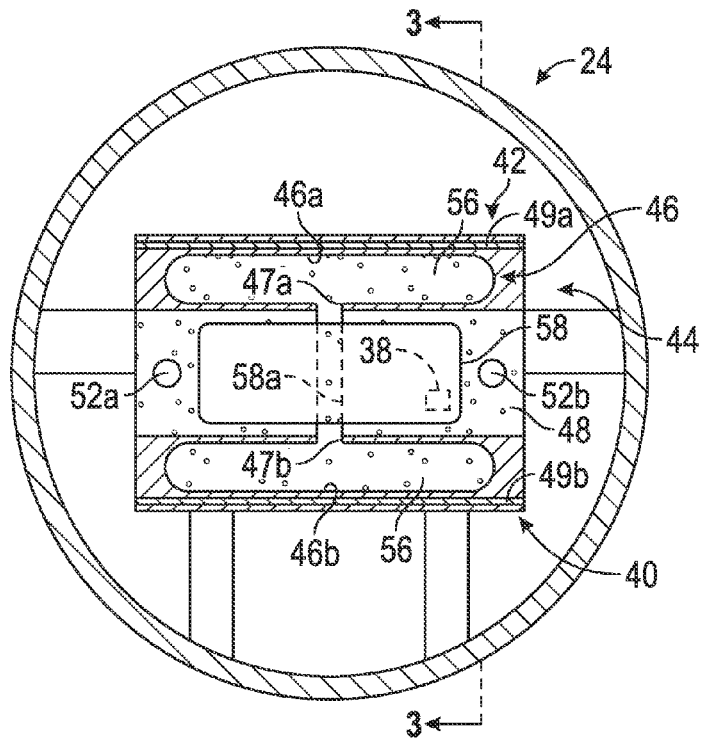
FIG. 2 is a cross-sectional view of the hand wheel of FIG. 1, taken along line 2-2 of FIG. 1, in accordance with an embodiment.

The vibration attenuation system 16 can be coupled to the steering system 14 so as to be disposed about the center line C of the hand wheel 24 and can be in communication with the control module 18. In one example, the vibration attenuation system 16 can be coupled to the hand wheel 24. It should be noted, however, that the vibration attenuation system 16 can be coupled to the steering shaft 26 or any other suitable portion of the steering system 14 to attenuate or dampen the translation vibration experienced by the steering system 14. In one example, the vibration attenuation system 16 can reduce the frequency response function amplitude at the hand wheel 24 when compared to a hand wheel 24 without the vibration attenuation system 16. With reference to FIGS. 1 and 2, the vibration attenuation system 16 can include a housing 40, a mounting bracket 42, a damping mass system 44 and a power supply 45 (FIG. 1).

The housing 40 can be sized to be coupled to the steering system 14. In one example, the housing 40 can be sized to be coupled to the hand wheel 24, and can have any desired shape. For example, the housing 40 can be substantially rectangular. The housing 40 can include at least one fluid chamber 46. In one example, the at least one fluid chamber 46 can comprise a first fluid chamber 46a and a second fluid chamber 46b. In this example, the first fluid chamber 46a can be spaced apart from and the second fluid chamber 46b. Each of the first fluid chamber 46a and second fluid chamber 46b can include a respective opening 47a, 47b. The opening 47a, 47b can enable the first fluid chamber 46a and second fluid chamber 46b to be in communication with a recess 48 defined in the space between the first fluid chamber 46a and second fluid chamber 46b. This can enable a portion of the damping mass system 44 to flow about the housing 40.

Figure 3:
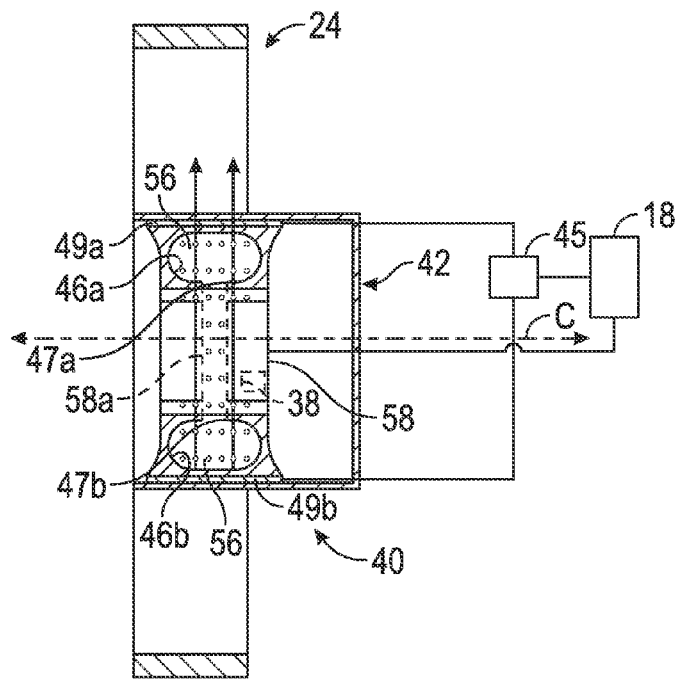
FIG. 3 is a cross-sectional view of the hand wheel of FIG. 2, taken along line 3-3 of FIG. 2, in accordance with an embodiment.

In addition, depending upon the damping mass system 44 employed, the housing 40 can include a first plate 49a and a second plate 49b. As illustrated in FIG. 3, the plates 49a, 49b can in communication with the power supply 45, and can be used to apply a magnetic flux field to the damping mass system 44. The application of the magnetic flux field can cause a portion of the damping mass system 44 to change viscosity, thereby changing the stiffness of the damping mass system 44, as will be discussed herein. It should be noted that the plates 49a, 49b can be in direct communication with the controller 18, if desired.

With reference to FIG. 2, the mounting bracket 42 can be used to couple the housing 40 to the hand wheel 24. In one example, with reference to FIG. 3, the mounting bracket 42 can be substantially U-shaped, and can be coupled to the housing 40 so as to surround the housing 40 on at least three sides. It should be noted that the mounting bracket 42 could be any suitable shape, and can be coupled to only a portion of the housing 40, if desired. Further, although the plates 49a, 49b are described and illustrated herein as being discrete from the mounting bracket 42, the plates 49a, 49b could be integral with the mounting bracket 42, if desired. The mounting bracket 42 can be integrally formed with the housing 40, or can be formed separately from the housing 40 and coupled to the housing 40 using a suitable post processing technique, such as welding, adhesives, mechanical fasteners, riveting, etc.

With reference to FIG. 2, the mounting bracket 42 can include at least one aperture 52, and in one example, can include a first aperture 52a and a second aperture 52b. The first aperture 52a and the second aperture 52b can each receive a mechanical fastener to couple the mounting bracket 42 to the hand wheel 24. It should be noted that the mounting bracket 42 can be coupled to the hand wheel 24 through any suitable technique, such as welding, adhesives, riveting, etc. Further, the housing 40 could be integrally formed with the hand wheel 24, if desired.

The damping mass system 44 can be received within the housing 40. The damping mass system 44 can include a damping fluid 56 and a mass 58. The damping fluid 56 can be received within the first fluid chamber 46a and second fluid chamber 46b, and can flow between the first fluid chamber 46a, second fluid chamber 46b and recess 48 via the openings 47a, 47b. In one example, the damping fluid 56 can be in communication with the power supply 45 (FIG. 1). The damping fluid 56 can include, but is not limited to, a magneto-rheological fluid. Generally, the viscosity of a magneto-rheological fluid can vary based upon the application of the magnetic flux field.

In this regard, the magneto-rheological fluid can include magnetically responsive particles, including, but not limited to, iron particles, which can be suspended in a carrier fluid. Without a magnetic flux present, the magnetically responsive particles can be orientated randomly in the carrier fluid. Upon the application of a magnetic flux, the orientation of the magnetically responsive particles can be linear, in the direction of the magnetic flux field (FIG. 3). The linear orientation of the magnetically responsive particles can change or increase the viscosity of the carrier fluid, which can cause the carrier fluid to act more as a solid. This can allow the stiffness of the damping mass system 44 to change based on the application of the magnetic flux field.

The amount of magnetic flux applied to the magneto-rheological fluid can be controlled by the control module 18, as will be discussed herein. The use of a magneto-rheological fluid can enable the damping and stiffness of the damping mass system 44 to change with the changes in the viscosity of the magneto-rheological fluid, which can enable substantially real-time adjustment of the damping mass system 44. Generally, with reference to FIG. 3, the power supply 45 can receive a signal from the control module 18 to apply a magnetic flux field to the plates 49a, 49b, which can change the viscosity of the damping fluid 56 depending on the vibration experienced at the hand wheel 24. This substantially real-time vibration attenuation can reduce the translational vibration experienced by the operator of the vehicle 10.

The mass 58 can be received within the recess 48 of the housing 40, and can be substantially submersed in the damping fluid 56. In one example, the mass 58 can float within the damping fluid 56, however, the mass 58 could also be fixed to the housing 40. The mass 58 can include a throughbore 58a. The throughbore 58a can enable the damping fluid 56 to flow through the mass 58. The mass 58 can provide a fixed amount of damping for the steering system 14. In this regard, the mass 58 can be selected to have a weight that provides a predetermined amount of damping or attenuation that corresponds to a particular engine speed. For example, the mass 58 can be selected to dampen translational vibration at engine idle speed. Thus, the damping fluid 56 can provide a variable amount of damping, which can be tuned substantially in real-time in response to translational vibration experienced at various engine speeds, while the mass 58 can provide a fixed amount of damping for a predetermined engine speed.

With reference back to FIG. 1, the power supply 45 can be in communication with the damping fluid 56 and can be controlled by the control module 18. The power supply 45 can be any suitable power source capable of supplying a current to the damping mass system 44 to apply the magnetic flux field to the damping fluid 56 to vary the viscosity of the damping fluid 56 substantially in real-time. In addition, although the power supply 45 is illustrated herein as a separate and discrete component, the power supply 45 could be integrated with other components of the vehicle 10, such as the control module 18.

The control module 18 can control the vibration attenuation system 16 based on signals received from the steering sensor 38 and/or speed sensor 22 to vary the damping and stiffness of the damping mass system 44. In one example, the control module 18 can control the viscosity of the damping fluid 56 based on signals received from the steering sensor 38.

Figure 4:
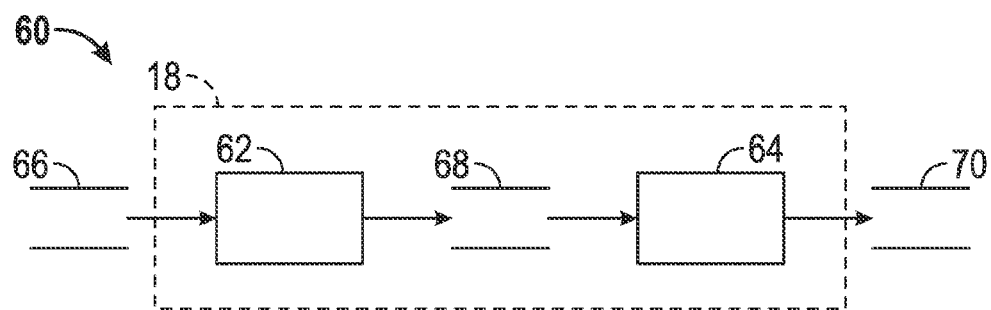
FIG. 4 is a dataflow diagram illustrating a control system of the vibration attenuation system in accordance with an embodiment.

Referring now to FIG. 4, a dataflow diagram illustrates various embodiments of a vibration attenuation control system 60 for the vibration attenuation system 16 (FIG. 1) that may be embedded within the control module 18. Various embodiments of vibration attenuation control systems according to the present disclosure can include any number of sub-modules embedded within the control module 18. As can be appreciated, the sub-modules shown in FIG. 4 can be combined and/or further partitioned to similarly adjust the stiffness of the damping fluid 56 (FIG. 2). Inputs to the system may be sensed from the vehicle 10 (FIG. 1), received from other control modules (not shown), and/or determined/modeled by other sub-modules (not shown) within the control module 18. In various embodiments, the control module 18 includes a vibration control module 62 and a damper control module 64.

The vibration control module 62 can receive as input accelerometer data 66 from the steering sensor 38. Based on the accelerometer data 66, the vibration control module 62 can set vibration data 68 for the damper control module 64. The vibration data 68 can comprise an amount of translational vibration experienced by the hand wheel 24 during the operation of the vehicle 10 as observed by the steering sensor 38.

The damper control module 64 can receive as input the vibration data 68. Based on the vibration data, the damper control module 64 can output damper data 70. The damper data 70 can comprise an amount of current to be output by the power supply 45 to generate the magnetic flux field to change the viscosity of the damping fluid 56 to the desired stiffness. In other words, based on the damper data 72, control signals are generated to control the current output by the power supply 45.

Figure 5:
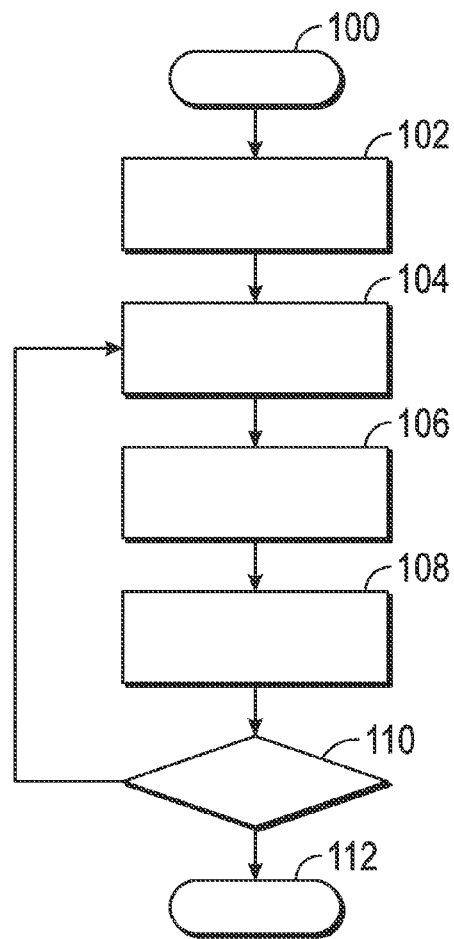
FIG. 5 is a flowchart illustrating a control method of the vibration attenuation system in accordance with an embodiment.

Referring now to FIG. 5, and with continued reference to FIGS. 1-4, a flowchart illustrates a control method that can be performed by the control module 18 of FIG. 1 in accordance with the present disclosure. As can be appreciated in light of the disclosure, the order of operation within the method is not limited to the sequential execution as illustrated in FIG. 5, but may be performed in one or more varying orders as applicable and in accordance with the present disclosure.

In various embodiments, the method can be scheduled to run based on predetermined events, and/or can run continually during operation of the vehicle 10.

The method can begin at 100. At 102, the method can receive accelerometer data 66 from the steering sensor 38. Based on the accelerometer data 66, the method can determine the amount of translational vibration experienced by the hand wheel 24 at 104. At 106, the method can determine the magnetic flux field needed to adjust the viscosity of the damping fluid 56 to the desired stiffness to attenuate the vibration experienced by the hand wheel 24 and can output the damper data 70 for the power supply 45. In one example, the following equations can be solved for the damping coefficient, $C_{TVA}$, to determine the amount of damping necessary to attenuate a measured vibration:

$$F = M^*\ddot{X} + (C + C_{TVA})^*\dot{X} - C_{TVA}^*\dot{X}_{TVA} + (K + K_{TVA})^*X - K_{TVA}^*X_{TVA} \qquad (1)$$

$$F_{TVA} = M_{TVA}^*\ddot{X}_{TVA} - C_{TVA}^*\dot{X} + (C + C_{TVA})^*\dot{X}_{TVA} - K_{TVA}^*X + (K + K_{TVA})^*X_{TVA} \qquad (2)$$

Wherein F is the force applied to/by a hand wheel not including the vibration attenuation system 16; M is the mass of a hand wheel not including the vibration attenuation system 16; $\ddot{X}$ is the acceleration of a hand wheel not including the vibration attenuation system 16; C is the damping coefficient for a hand wheel not including the vibration attenuation system 16; $\dot{X}$ is the velocity of a hand wheel not including the vibration attenuation system 16; K is the stiffness of a hand wheel not including the vibration attenuation system 16; X is the displacement of a hand wheel not including the vibration attenuation system 16; $F_{TVA}$ is the force applied to/by the hand wheel 24 including the vibration attenuation system 16; $M_{TVA}$ is the mass of the hand wheel 24 including the vibration attenuation system 16; $\ddot{X}_{TVA}$ is the acceleration of the hand wheel 24 including the vibration attenuation system 16; $C_{TVA}$ is the damping coefficient of the hand wheel 24 including the vibration attenuation system 16; $\dot{X}_{TVA}$ is the velocity of the hand wheel 24 including the vibration attenuation system 16; $X_{TVA}$ is the displacement of the hand wheel 24 including the vibration attenuation system 16; and $K_{TVA}$ is the stiffness of the hand wheel 24 including the vibration attenuation system 16. The values associated with a hand wheel not including the vibration attenuation system 16 can be obtained from a suitable source, including, but not limited to, a look-up table.

At 108, the method can receive accelerometer data 66 from the steering sensor 38. If the hand wheel 24 is still experiencing vibration based on the accelerometer data 66 at 110, then the method can loop to 104. Otherwise, the method can end at 112.

Figure 6:
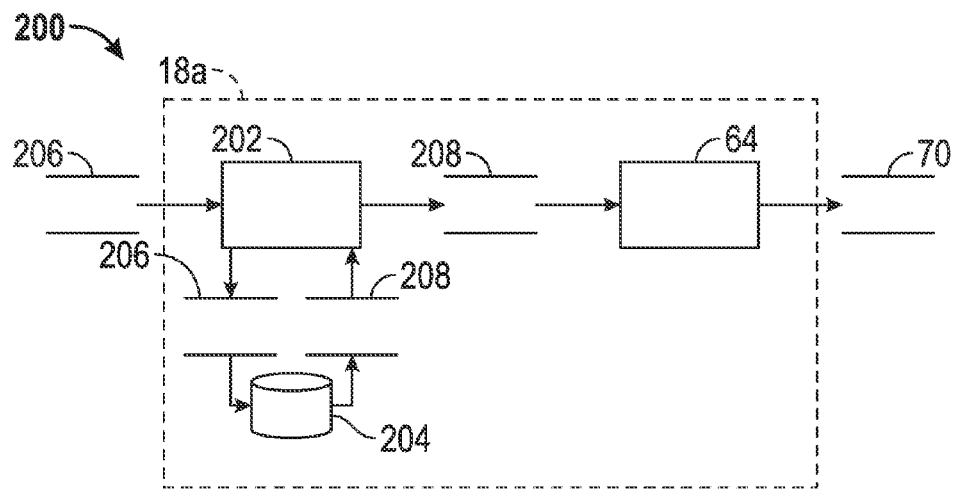
FIG. 6 is a dataflow diagram illustrating a control system of the vibration attenuation system in accordance with another embodiment.

Alternatively, with reference to FIG. 6, in another exemplary embodiment, where the same reference numerals can indicate the same or similar components, a control module 18*a* can control the vibration attenuation system 16 based on signals received from the speed sensor 22 to vary the damping and stiffness of the damping mass system 44. In FIG. 6, a dataflow diagram illustrates various embodiments of a vibration attenuation control system 200 for the vibration attenuation system 16 (FIG. 1) that may be embedded within the control module 18*a*. Various embodiments of vibration attenuation control systems according to the present disclosure can include any number of sub-modules embedded within the control module 18*a*. As can be appreciated, the sub-modules shown in FIG. 6 can be combined and/or further partitioned to similarly adjust the stiffness of the damping fluid 56 (FIG. 2). Inputs to the system may be sensed from the vehicle 10 (FIG. 1), received from other control modules (not shown), and/or determined/modeled by other sub-modules (not shown) within the control module 18*a*. In various embodiments, the control module 18*a* includes a vibration control module 202, a data store 204 and the damper control module 64.

The vibration control module 202 can receive as input engine speed data 206 from the speed sensor 22. Based on the engine speed data 206, the vibration control module 202 can look up vibration data 208 from a look-up table stored in the data store 204. The look-up table can contain vibration data 208 that corresponds to the amount of translational vibration experienced by the hand wheel 24 an observed engine speed or range of engine speeds. The vibration control module 202 can set this vibration data 208 for the damper control module 64. It should be noted that although the vibration control module 202 is described and illustrated herein as receiving only the engine speed data 206 as input, the vibration control module 202 could also receive the accelerometer data 66 as input. The use of both the engine speed data 206 and the accelerometer data 66 can improve the reliability of the vibration data 208 output by the vibration control module 202.

Figure 7:
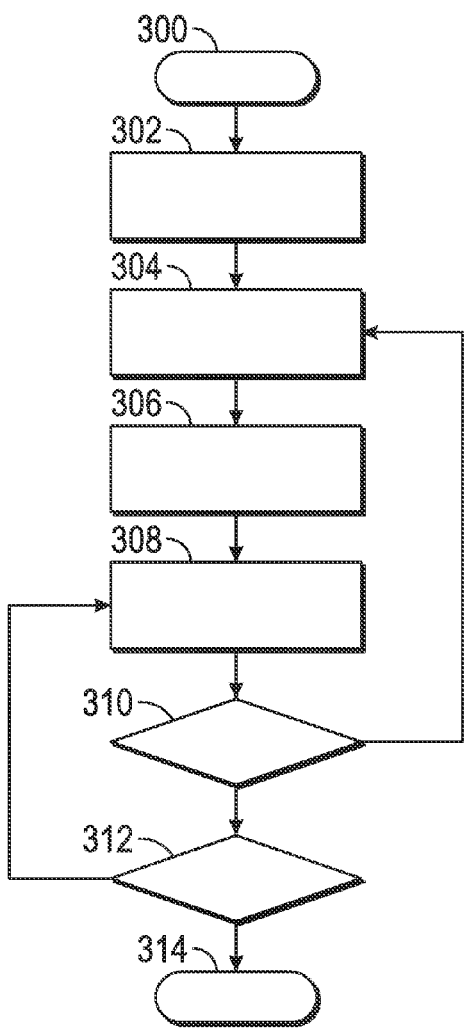
FIG. 7 is a flowchart illustrating a control method of the vibration attenuation system in accordance with another embodiment.

Referring now to FIG. 7, and with continued reference to FIGS. 1-3 and 6, a flowchart illustrates a control method that can be performed by the control module 18*a* in accordance with the present disclosure. As can be appreciated in light of the disclosure, the order of operation within the method is not limited to the sequential execution as illustrated in FIG. 6, but may be performed in one or more varying orders as applicable and in accordance with the present disclosure.

In various embodiments, the method can be scheduled to run based on predetermined events, and/or can run continually during operation of the vehicle 10.

The method can begin at 300. At 302, the method can receive engine speed data 206 from the speed sensor 22. Based on the engine speed data 206, the method can look up the vibration data 208 that corresponds to the observed engine speed data 206 at 304. At 306, the method can determine the amount of current needed to adjust the viscosity of the damping fluid 56 to the desired stiffness to attenuate the vibration experienced by the hand wheel 24 and can output the damper data 70 for the power supply 45. At 308, the method can receive engine speed data 206 from the speed sensor 22. If the engine speed has changed based on the engine speed data 206 at 310, then the method can loop to 304. Otherwise, the method can determine if the engine 12 is running at 312. If the engine is still running, the method can loop to 308. Otherwise, the method can end at 314.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A system for attenuating translational vibration in a steering system, comprising:
    a housing including a fluid chamber, a recess and a mounting bracket that couples the housing to a hand wheel of the steering system, the fluid chamber in communication with the recess;
    a mass disposed in the recess of the housing, the mass having a fixed stiffness;
    a damping fluid disposed in the housing so as to flow between the fluid chamber and the recess, the mass movable in the damping fluid and the damping fluid having a variable stiffness; and
    a control module that determines a translational vibration experienced at the hand wheel and outputs a signal to vary the stiffness of the damping fluid in response to the translational vibration in substantially real-time.

2. The system of claim 1, wherein the fluid chamber further comprises:
    a first fluid chamber having an opening; and
    a second fluid chamber having an opening spaced apart from the first fluid chamber so as to define the recess therebetween,
    wherein the damping fluid is in fluid communication with the first fluid chamber, second fluid chamber and the recess.

3. The system of claim 2, wherein the mass further comprises a passage defined through the mass to enable the damping fluid to flow through the mass.

4. The system of claim 1, wherein the damping fluid is a magneto-rheological fluid and the system further comprises:
    a power supply in communication with one or more plates positioned adjacent to the damping fluid and the control module that receives the signal from the control module to vary the stiffness of the damping fluid by varying a current applied to the one or more plates.

5. The system of claim 1, further comprising:
an accelerometer coupled to the mass that provides the control module with accelerometer data, and the control module determines the translational vibration experienced at the hand wheel based on the accelerometer data.

6. The system of claim 1, wherein the hand wheel is coupled to a steering system of a motor vehicle having an engine.

7. The system of claim 6, further comprising:
a speed sensor associated with the engine that provides the control module with engine speed data, and the control module determines the translational vibration experienced at the hand wheel based on the engine speed data.

8. The system of claim 7, further comprising a data store that stores a look-up table that includes a predetermined translational vibration for a given engine speed, and the control module determines the translational vibration experienced at the hand wheel based on the engine speed data from the look-up table.

9. The system of claim 1, wherein the housing is coupled about a center line of the hand wheel.

10. A vehicle, comprising:
a steering system that includes a hand wheel;
a vibration attenuation system coupled to the hand wheel about a center line of the hand wheel, the vibration attenuation system including:
a housing including a fluid chamber, a recess and having a mounting bracket that couples the vibration attenuation system to the hand wheel;
a magneto-rheological damping fluid disposed within the housing so as to flow between the fluid chamber and the recess; and
a mass disposed within the recess of the housing and movable within the damping fluid,
wherein the viscosity of the damping fluid is adjustable based upon an amount of translational vibration experienced at the hand wheel.

11. The vehicle of claim 10, further comprising:
a control module that determines the amount of translational vibration experienced at the hand wheel and adjusts the viscosity of the damping fluid based on the amount of translational vibration.

12. The vehicle of claim 11, further comprising:
an accelerometer coupled to the mass that provides the control module with accelerometer data, and the control module determines the translational vibration experienced at the hand wheel based on the accelerometer data.

13. The vehicle of claim 12, wherein the accelerometer observes the acceleration of the hand wheel in a direction substantially perpendicular to the center line of the hand wheel.

14. The vehicle of claim 11, further comprising:
an engine; and
a speed sensor associated with the engine that provides the control module with engine speed data, and the control module determines the translational vibration experienced at the hand wheel based on the engine speed data.

15. The vehicle of claim 14, further comprising a data store that stores a look-up table that includes a predetermined translational vibration for a given engine speed, and the control module determines the translational vibration experienced at the hand wheel based on the engine speed data from the look-up table.

16. A method of attenuating translational vibration in a steering system, comprising:
receiving an input;
based on the input, determining an amount of translational vibration experienced near a hand wheel of the steering system; and
outputting a signal to adjust a viscosity of a damping fluid to change a stiffness of a damping system coupled to a portion of the hand wheel, the damping fluid disposed within a housing of the damping system so as to flow between a fluid chamber and a recess of the housing, the damping system including a mass disposed within the recess of the housing.

17. The method of claim 16, wherein receiving an input further comprises:
receiving an input from an accelerometer coupled to the damping system.

18. The method of claim 16, wherein receiving an input further comprises:
receiving the input from a speed sensor associated with the engine of a vehicle.

19. The method of claim 18, wherein determining an amount of translational vibration experienced further comprises:
accessing a look-up table to determine a predetermined amount of vibration present for a given engine speed.

20. The method of claim 16, wherein the damping fluid is a magneto-rheological fluid and outputting a signal to adjust the viscosity of the damping fluid further comprises:
varying an amount of current applied from a power supply to one or more plates positioned adjacent to the damping fluid.

* * * * *